United States Patent
Dhuse et al.

(10) Patent No.: US 10,585,751 B2
(45) Date of Patent: Mar. 10, 2020

(54) PARTIAL REBUILD OPERATION WITHIN A DISPERSED STORAGE NETWORK INCLUDING LOCAL MEMORY AND CLOUD-BASED ALTERNATIVE MEMORY

(71) Applicant: International Business Machines Corporation, Armonk, NY (US)

(72) Inventors: Greg R. Dhuse, Chicago, IL (US); Ravi V. Khadiwala, Bartlett, IL (US)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 15/336,013

(22) Filed: Oct. 27, 2016

(65) Prior Publication Data
US 2018/0121289 A1  May 3, 2018

(51) Int. Cl.
*G06F 11/10* (2006.01)
*G06F 3/06* (2006.01)

(52) U.S. Cl.
CPC .......... *G06F 11/1092* (2013.01); *G06F 3/064* (2013.01); *G06F 3/067* (2013.01)

(58) Field of Classification Search
CPC .................................................. G06F 11/1076
USPC ......................................................... 714/764
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay et al. |
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Fritz Alphonse
(74) *Attorney, Agent, or Firm* — Garlick & Markison; Timothy W. Markison; Patricia A. Markison

(57) ABSTRACT

A method includes detecting an encoded data slice of a set of encoded data slices that requires rebuilding. A storage unit of the DSN includes a local memory and cloud-based alternative memory. The storage unit stores at least one of first and second encoded data slices of the set of encoded data slices in the cloud-based alternative memory. The method further includes determining whether to rebuild the encoded data slice using a full rebuild operation or partial rebuild operation. When determined to rebuild the encoded data slice using the partial rebuild operation, a partial rebuild request is sent to the storage unit. The storage unit then generates partial rebuilding data based on the first and second encoded data slices. The rebuilding module then creates a rebuilt encoded data slice from the partial rebuilding data and other partial rebuilding data from other storage units.

14 Claims, 7 Drawing Sheets

(56) References Cited

U.S. PATENT DOCUMENTS

| | | |
|---|---|---|
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 8,595,596 B2 | 11/2013 | Grube |
| 8,756,480 B2 * | 6/2014 | Gladwin ............... H04L 65/602 714/763 |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma et al. |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula, Jr. |
| 2005/0132070 A1 | 6/2005 | Redlich et al. |
| 2005/0144382 A1 | 6/2005 | Schmisseur |
| 2005/0229069 A1 | 10/2005 | Hassner |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll, Jr. |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters, III et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2012/0311395 A1 | 12/2012 | Leggette |
| 2015/0006996 A1 | 1/2015 | Volvovski |
| 2016/0055060 A1 * | 2/2016 | Resch ............... G06F 11/1044 714/764 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

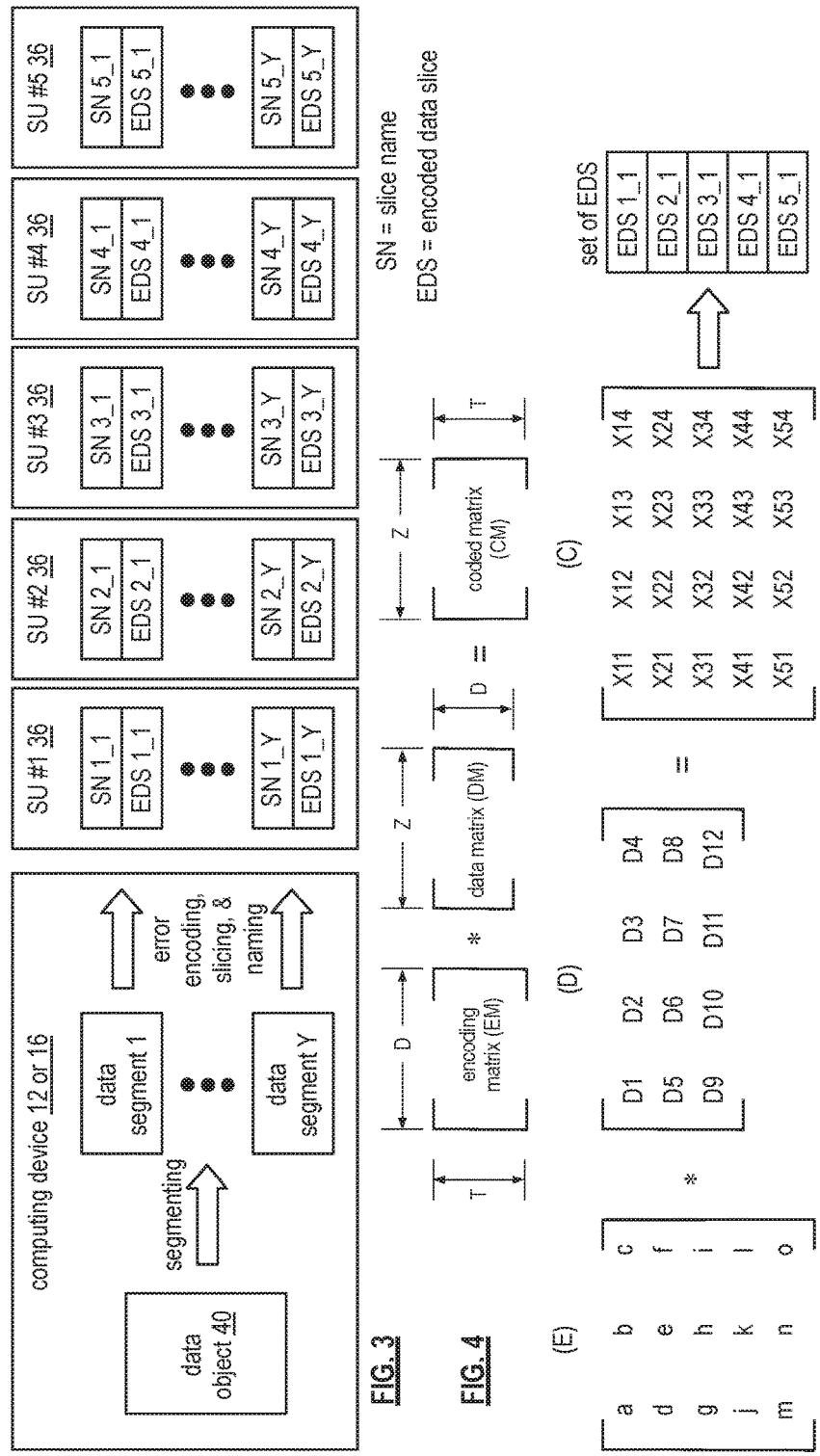

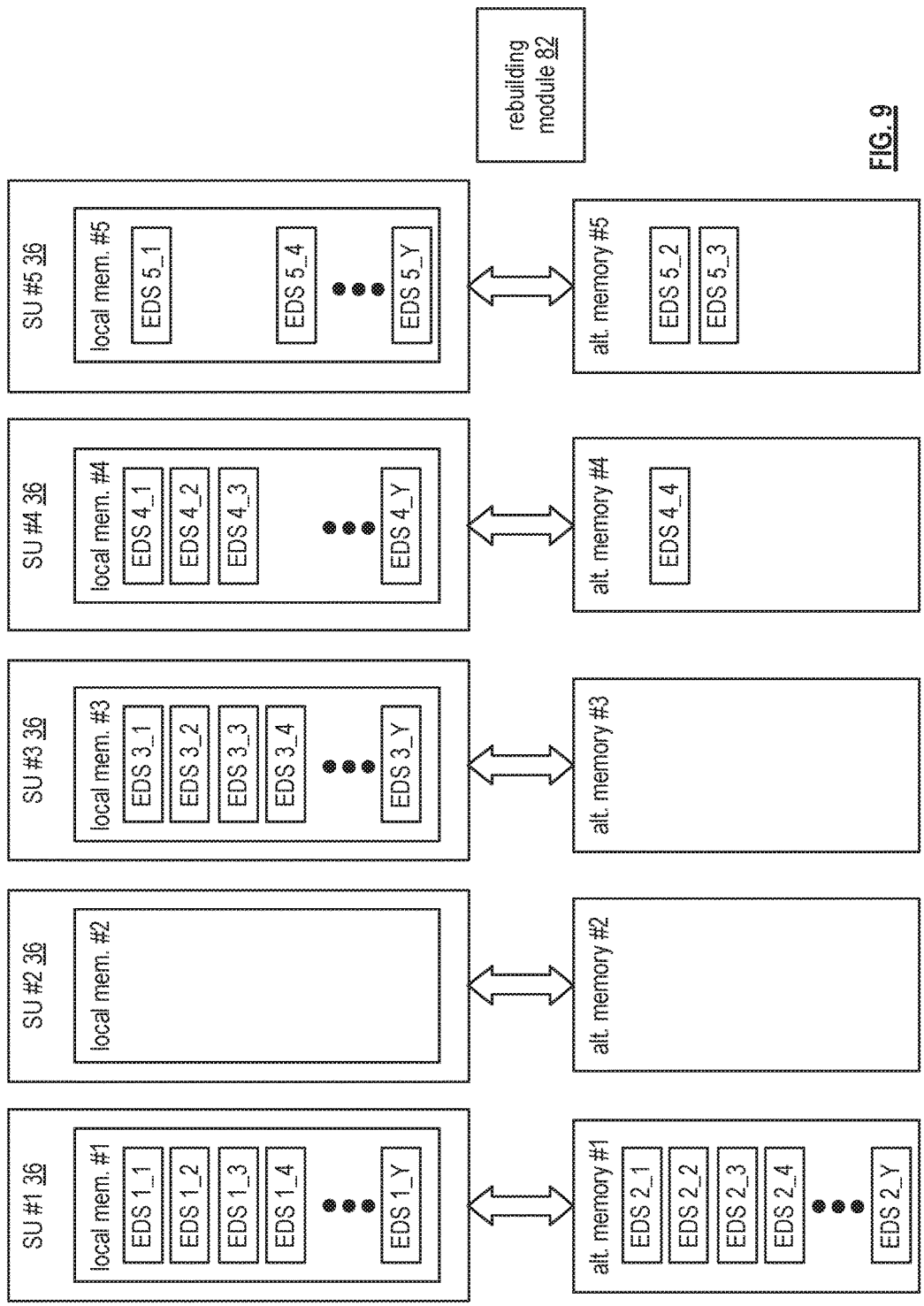

PARTIAL REBUILD OPERATION WITHIN A DISPERSED STORAGE NETWORK INCLUDING LOCAL MEMORY AND CLOUD-BASED ALTERNATIVE MEMORY

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Within any cloud storage system, hardware device will fail. Recovering from hardware failure without loss of data and with minimal disruption to performance is an important feature for cloud storage systems. Some cloud storage systems employ a self-healing or rebuilding function to detect hardware failures, recreate the data that was stored on the failed hardware, and store the recreated data on properly functioning hardware. Such a self-healing function is process intensive and involves at least a decode threshold number of storage units, which can, at times, provide more than a minimal disruption to performance.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 9 is a schematic block diagram of an embodiment of storage units of the DSN that include local memory and cloud-based alternative memories in accordance with the present invention;

FIG. 10 is a diagram of an example of a storage unit generating first and second partial rebuilding data in accordance with the partial rebuild operation in accordance with the present invention FIG. 11 illustrates a storage unit combining first and second partial rebuilding data to create a partial result in accordance with the present invention;

FIG. 12 illustrates a rebuilding module receiving the partial result and the other partial rebuilding data from the storage units in accordance with the present invention.

DETAILED DESCRIPTION OF THE INVENTION

Figure 1:
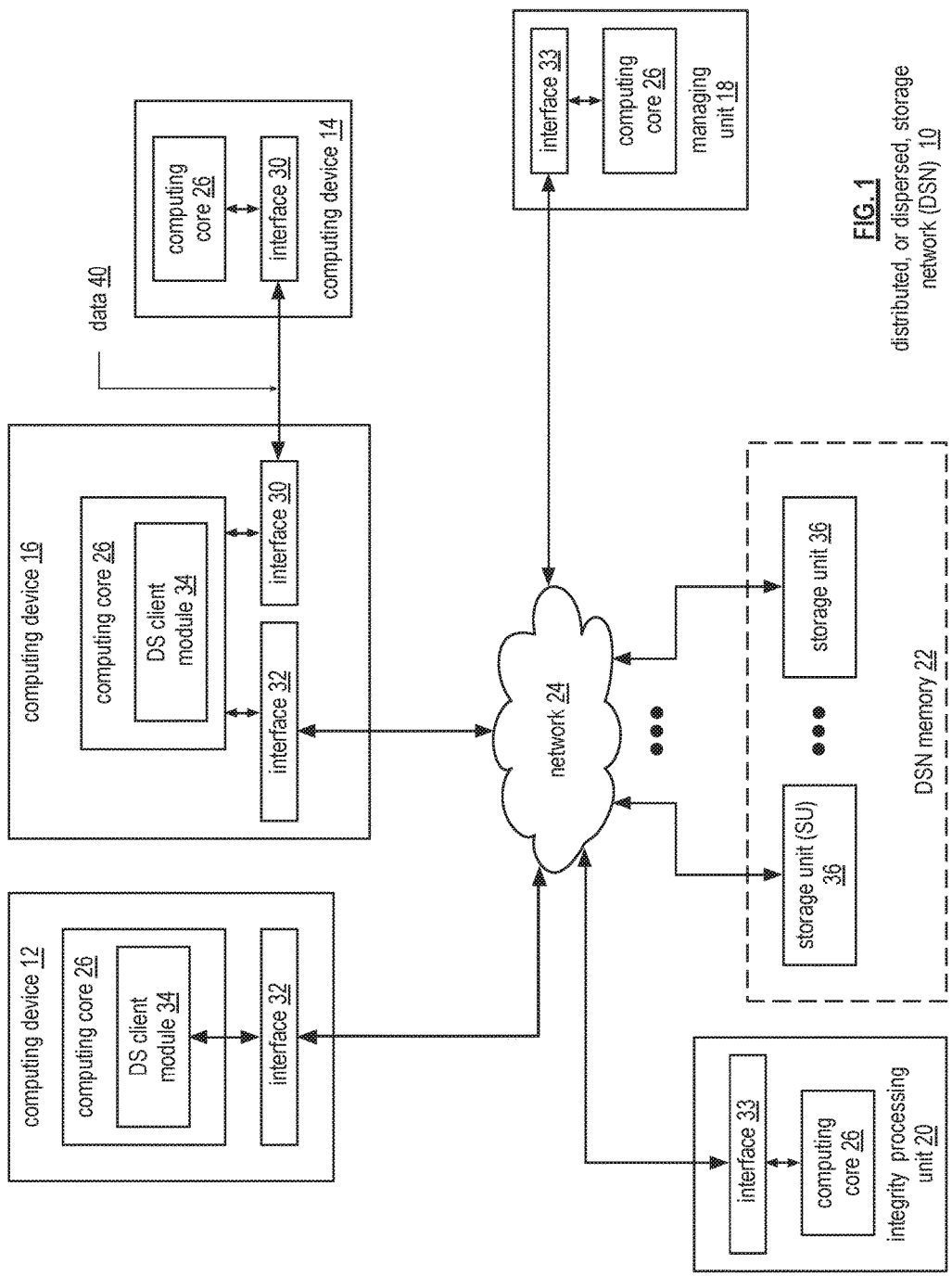
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
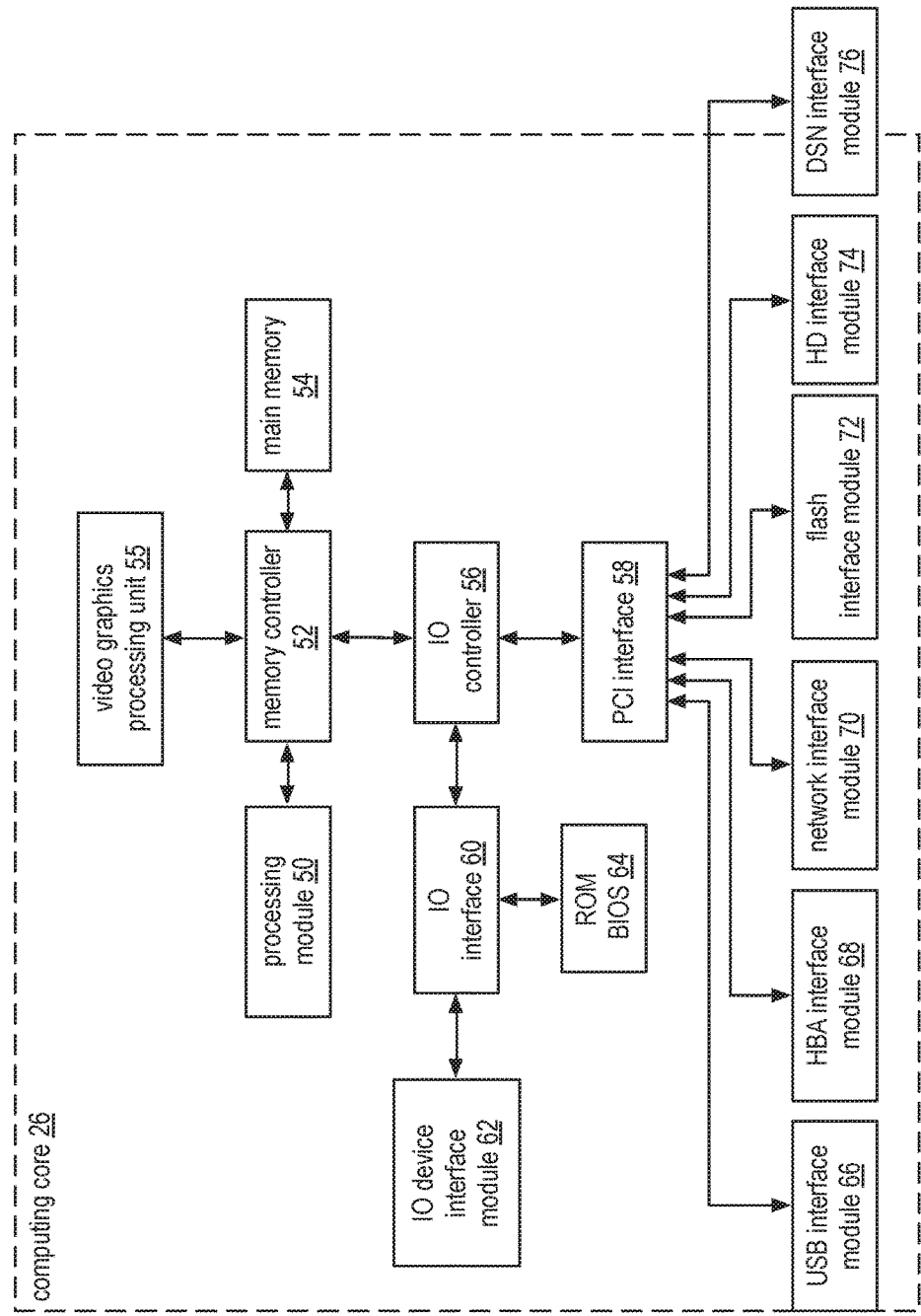
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSTN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSTN managing unit 18 tracks the number of times a user accesses a non-public vault and/or public vaults, which can be used to generate a per-access billing information. In another instance, the DSTN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSTN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
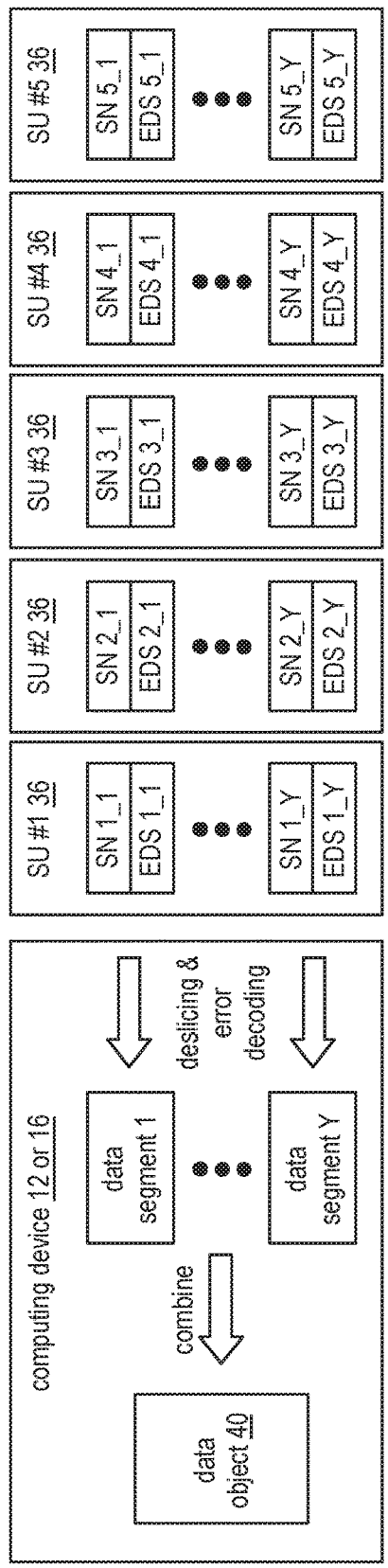
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
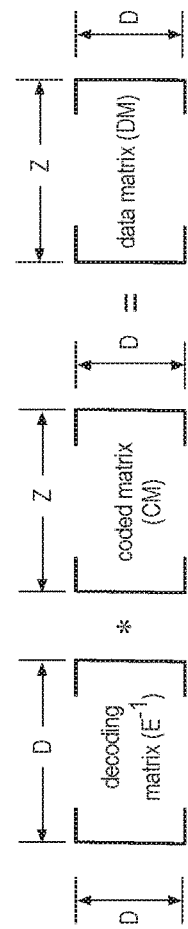
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

FIG. 9 is a schematic block diagram of an embodiment of storage units 36 of the DSN that include local memory and cloud-based alternative memories. In this example, each storage unit 1-5 of the DSN has a local memory 1-5, respectively, as well a cloud-based alternative memory 1-5, respectively. A cloud-based alternative memory may be a private or public storage system that is accessible via a local network and/or via a wide area network. As an example, the cloud-based alternative memory is a storage server shared by one or more storage units via a local area network. As another example, a storage unit uses one or more storage units of a different DSN as the cloud-based alternative memory. As yet another example, a storage unit subscribes to a cloud storage service.

The local memory of each storage unit includes a plurality of memory devices. The memory devices include one or more of volatile memory, non-volatile memory, random access memory, solid state memory, hard drives, magnetic tape memory, etc. From storage unit to storage unit, the local memory includes the same or different combinations of memory devices. For example, if the storage units are manufactured and deployed at the same time, they are likely to all have the same plurality of memory devices within their local memory. As another example, if the storage units are manufactured at different times, or have gone through a memory device upgrade, then it likely that the storage units will have different compositions of memory devices within their respective local memories.

As shown, data segments of a data object are dispersed storage error encoded into sets of encoded data slices. Storage units 1-5 are capable of storing encoded data slices of the sets of encoded data slices in local memory, in cloud-based alternative memory, or in both. In order to store an encoded data slice in local memory, a storage unit converts a DSN logical address of the encoded data slice into a physical address for storage in the local memory. Each of the DS storage units maintains a local virtual DSN address to physical location table to convert the virtual DSN address of the encoded data slice(s) into physical storage addresses. For example, a storage unit may maintain a local table correlating slice names (virtual DSN address) to the addresses of the physical media internal to the storage unit.

To store an encoded data slice in cloud-based alternative memory, a storage unit temporarily stores the encoded data slice in its local memory. The storage unit then converts the DSN logical address of the encoded data slice into a cloud-based alternative memory logical address for storage in the cloud-based alternative memory. For example, if the storage unit is using one or more storage units of a different DSN as the cloud-based alternative memory, the storage unit would convert the local DSN logical address (e.g., the slice name in accordance with the local DSN) of the encoded data slice to a DSN logical address that pertains to the one or more storage units of the different DSN (e.g., a slice name in accordance with the different DSN). The storage unit then outputs the encoded data slice for storage in the cloud-based alternative memory based on the cloud-based alternative memory logical address.

In this example, storage unit #1 is storing encoded data slices from pillar 1 and data segments 1-Y (EDS 1_1 through EDS 1_Y) in local memory #1. Storage unit #1 is additionally storing encoded data slices from pillar 2 and data segments 1-Y (EDS 2_1 through EDS 2_Y) in alternative memory #1. Storage unit #2 is not storing any encoded data slices in either local memory #2 or alternative memory #2. Storage unit #3 is storing encoded data slices from pillar 3 and data segments 1-Y (EDS 3_1 through EDS 3_Y) in local memory #3 but is not storing any encoded data slices in alternative memory #3. Storage unit #4 is storing encoded data slices from pillar 4 and data segments 1-3 and 5-Y (EDS 4_1, EDS 4_2, EDS 4_3 and EDS 4_5 through EDS 4_Y) in local memory #4. Storage unit #4 is additionally storing an encoded data slice from pillar 4 and data segment 4 (EDS 4_4) in alternative memory #4. Storage unit #5 is storing encoded data slices from pillar 5 and data segments 1 and 4-Y (EDS 5_1 and EDS 5_4 through EDS 5_Y) in local memory #5. Storage unit #5 is additionally storing an encoded data slice from pillar 5 and data segment 2 (EDS 5_2) as well as an encoded data slice from pillar 5 and data segment 3 (EDS 5_3) in alternative memory #5.

One or more of the storage units 1-5 may also include a rebuilding module 82. Alternatively, the rebuilding module 82 may be a separate computing device, may be a common computing device, and/or may be integrated into one or more of the computing devices 12-16, the managing unit 18, and/or the integrity processing unit 20. The rebuilding module 82 detects whether an encoded data slice stored in the storage units requires rebuilding. For instance, with reference to FIG. 7, the rebuilding module may detect that EDS 3_1 within storage unit #3 requires rebuilding.

Typically, during a standard (i.e., full) rebuilding operation, the rebuilding module will send slice retrieval requests to a subset of storage units of the DSN that do not include the particular storage unit that is storing the encoded data slice requiring rebuilding. For instance, when EDS 3_1 of FIG. 7 requires rebuilding, the rebuilding module will send slice retrieval requests to at least three of storage units 1, 2, 4, and 5 of FIG. 7 (when the decode threshold is three) to retrieve at least a decode threshold of encoded data slices of the set of encoded data slices. The storage units then output the decode threshold number of encoded data slices of the set of encoded slices to the rebuilding module in response to the slice retrieval requests. The rebuilding module then reconstructs the data segment from the decode threshold number of encoded data slices. The rebuilding module then dispersed error encodes the reconstructed data segment to produce a new set of encoded slices. The rebuilding module then selects one of the new set of encoded data slices as the rebuilt encoded data slice. Therefore, a full rebuilding function requires each storage unit of the subset of storage units to provide one encoded slice of the set of encoded data slices to the rebuilding module via the network.

However, as shown in FIG. 9, a storage unit with a local memory and a cloud-based alternative memory is capable of storing multiple slices from the same set of encoded data slices. For example, storage unit #1 is storing EDS 1_1 (an encoded data slice from data segment #1) in its local memory and is storing EDS 2_1 (another encoded data slice from data segment #1) in its cloud-based alternative memory. Without the cloud-based alternative memory, these slices would typically be stored in different storage units. If the rebuilding module detects that a storage unit is storing more than one encoded data slice from a set of encoded data slices (i.e., a storage unit is storing more than one encoded data slice from the same data segment), the rebuilding module will opt to perform a partial rebuilding operation as opposed to a full rebuilding operation to rebuild the encoded data slice. Applying the partial rebuilding operation in an environment where more than one encoded data slice from a set are stored in the same storage unit allows for reductions in networking costs associated with rebuilding slices in comparison to the networking costs of performing a full rebuilding operation.

When the rebuilding module determines that an encoded data slice will be rebuilt using the partial rebuilding function, the rebuilding module sends partial rebuild requests to the storage units storing encoded data slices from the same data segment as the encoded data slice that requires rebuilding. For example, if EDS 3_1 within storage unit #3 requires rebuilding, the rebuilding module 82 will determine that because storage unit #1 stores more than one encoded data slice from the set of encoded data slices needed to rebuild EDS 3_1 (i.e., EDS 1_1 and EDS 2_1), a partial rebuild operation will be used to rebuild EDS 3_1. The rebuilding module 82 will then send partial rebuild requests to either storage units 1 and 4 or storages units 1 and 5 (when the decode threshold is three) because storage units 4 and 5 each store one slice from the same data segment as EDS 3_1 (i.e., EDS 4_1 and EDS 5_1) while storage unit 1 stores two slices from the same data segment as EDS 3_1 (i.e., EDS 1_1 and EDS 2_1). In this example, the rebuilding module will send partial rebuild requests to storage units 1 and 4. When the rebuilding module 82 sends a partial rebuild request to storage unit #1, storage unit #1 will generate first partial rebuilding data based on EDS 1_1 (stored in local memory). Storage unit #1 will then retrieve EDS 2_1 from alternative memory #1 and generate second partial rebuilding data based on EDS 2_1. Storage unit #1 will then combine the first and second partial rebuilding data to create a partial result. Storage unit #1 will then send the partial result to the rebuilding module 82.

When the rebuilding module 82 sends a partial rebuild request to storage unit #4, storage unit #4 will generate other partial rebuilding data based on EDS 4_1. Storage unit #4 then sends the other partial rebuilding data to the rebuilding module 82. The partial result generated by combining the first and second partial rebuilding data of storage unit #1 is the same size as individual partially rebuilt slices (e.g., the other partial rebuilding data based on EDS 4_1). As such, when a storage unit stores more than one encoded data slice from the set of encoded data slices, the partial rebuild operation I/O reduction is proportional to the number of slices held by the storage unit. For example, storage unit #1 holds two slices from the same source. Therefore, combining two sets of rebuilding data based on two slices from the same storage unit will be ½ the size of two sets of rebuilding data based on two slices from two different storage units. The rebuilding module 82 will then combine the partial result with the other partial rebuilding data from other storage units to create the rebuilt encoded data slice. A more detailed discussion of the partial rebuilding function is subsequently described with reference to one or more of FIGS. 10-12.

FIG. 10 is a diagram of an example of a storage unit generating first and second partial rebuilding data in accordance with the partial rebuild operation. This example assumes that encoded data slice EDS 3_1 is to be rebuilt. Accordingly, in response to partial rebuild requests from the rebuilding module, storage unit 1 will generate first and second partial rebuilding data and either storage unit #4 or #5 will generate other partial rebuilding data. This example is from the perspective of storage unit 1, which stores encoded data slice EDS 1_1 in local memory and EDS 2_1 in alternative memory #1. Storage unit #1 retrieves EDS 2_1 from alternative memory location #1. The storage unit then performs a partial decoding of the encoded data slice EDS 1_1 using selected rows of the decoding matrix. This produces a first partial decode matrix, which is illustrated to include $x_1 S1\_1$; $x_2 S1\_1$; and $x_3 S1\_1$. $x_1$, $x_2$, and $x_3$ are coefficients of the decoding matrix and S1_1 corresponds to the encoded data slice EDS 1_1. The storage unit then performs a partial encoding step by matrix multiplying the first partial decode matrix with a reduced encode matrix (E) to produce the partial rebuilding data #1 and the first partial rebuilding data. The reduced encoded matrix is reduced to a single row that corresponds to the row of the full encoded matrix that created encoded data slice EDS 3_1 (i.e., the slice that is being rebuilt). In this example, the coefficients of the relevant row are g, h, and i, such that the first partial slice rebuilding data may be expressed in Gaussian Field as $g^* x_1 S1\_1 + h^* x_2 S1\_1 + i^* x_3 S1\_1$.

The storage unit then performs a partial decoding of the encoded data slice EDS 2_1 using selected rows of the decoding matrix. This produces a second partial decode matrix which is illustrated to include $x_1 S2\_1$; $x_2 S2\_1$; and $x_3 S2\_1$. $x_1$, $x_2$, and $x_3$ as coefficients of the decoding matrix and S2_1 corresponds to the encoded data slice EDS 2_1. The storage unit then performs a partial encoding step by matrix multiplying the second partial decode matrix with a reduced encode matrix (E) to produce the second partial rebuilding data. The reduced encoded matrix is reduced to a single row that corresponds to the row of the full encoded matrix that created encoded data slice EDS 3_1 (i.e., the one being rebuilt). In this example, the coefficients of the relevant row are g, h, and i, such that the second partial slice rebuilding data may be expressed in Gaussian Field as $g^* x_1 S2\_1 + h^* x_2 S2\_1 + i^* x_3 S2\_1$ for EDS 2_1.

FIG. 11 illustrates a storage unit combining the first and second partial rebuilding data to create a partial result. The storage unit performs a function on the first and second partial rebuilding data to generate the partial result. For example, the rebuilding module performs an exclusive OR function in Galois Field (2) on the first and second partial rebuilding data to generate the partial result.

FIG. 12 illustrates a rebuilding module receiving the partial result and the other partial rebuilding data from the storage units. The rebuilding module performs a function on the set of partial result and the other partial rebuilding data to generate the rebuilt encoded data slice (e.g., EDS 3_1). For example, the rebuilding module performs an exclusive OR function in Galois Field (2) on partial result and the other partial rebuilding data to generate the rebuilt encoded data slice. For a more detailed discussion of partial rebuilding refer to issued patent entitled "METHOD AND APPARATUS FOR SLICE PARTIAL REBUILDING IN A DISPERSED STORAGE NETWORK" having a U.S. Pat. No. 8,706,980.

Figure 13:
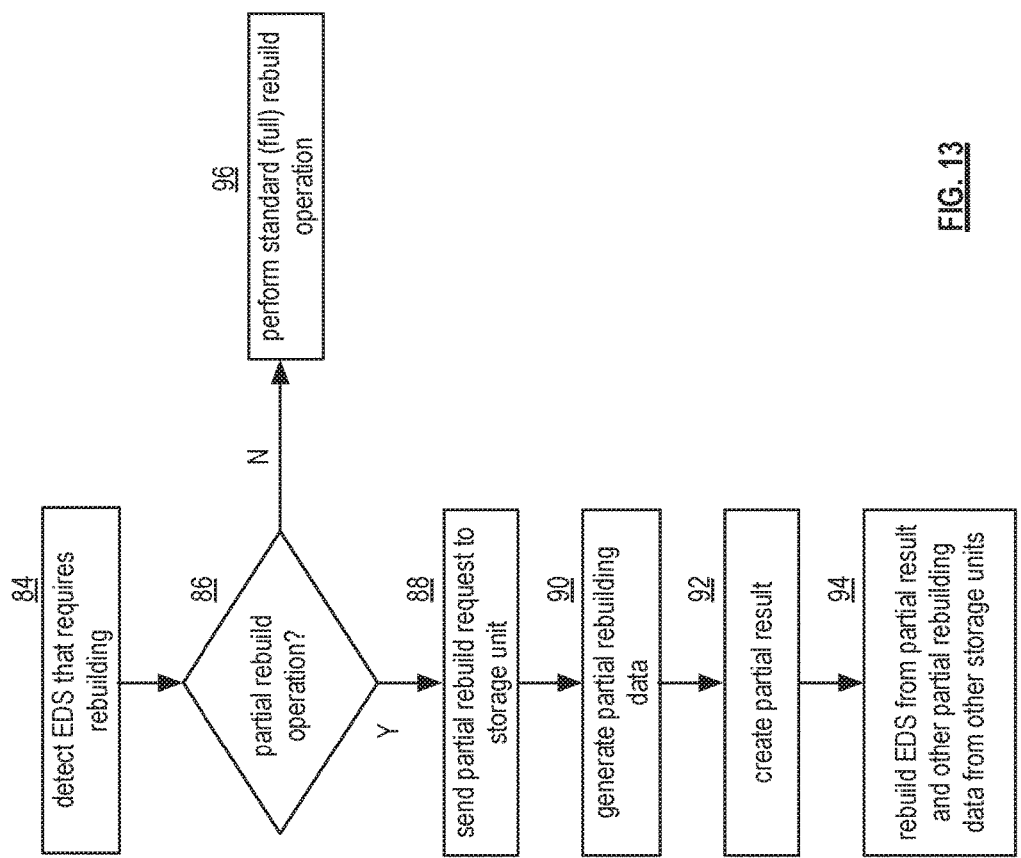
FIG. 13 is a logic diagram of an example of a method of rebuilding an encoded data slice using a partial rebuild operation in accordance with the present invention.

FIG. 13 is a logic diagram of an example of a method of rebuilding an encoded data slice using a partial rebuild operation. The method begins at step 84 where a rebuilding module within a device of the DSN detects an encoded data slice of a set of encoded data slices that requires rebuilding. A storage unit of the DSN includes a local memory and a cloud-based alternative memory. A cloud-based alternative memory may be a private or public storage system that is accessible via a local network and/or via a wide area network. As an example, the cloud-based alternative memory is storage server shared by one or more storage units via a local area network. As another example, a storage unit uses one or more storage units of a different DSN as the cloud-based alternative memory. As yet another example, a storage unit subscribes to a cloud storage service.

The local memory of each storage unit includes a plurality of memory devices. The memory devices include one or more of volatile memory, non-volatile memory, random access memory, solid state memory, hard drives, magnetic tape memory, etc. From storage unit to storage unit, the local memory includes the same or different combinations of memory devices. For example, if the storage units are manufactured and deployed at the same time, they are likely to all have the same plurality of memory devices within their local memory. As another example, if the storage units are manufactured at different times, or have gone through a memory device upgrade, then it likely that the storage units will have different compositions of memory devices within their respective local memories.

In order to store an encoded data slice in local memory, a storage unit converts a DSN logical address of the encoded data slice into a physical address for storage in the local memory. Each of the DS storage units maintains a local virtual DSN address to physical location table to convert the virtual DSN address of the encoded data slice(s) into physical storage addresses. For example, a storage unit may maintain a local table correlating slice names (virtual DSN address) to the addresses of the physical media internal to the storage unit. To store an encoded data slice in cloud-based alternative memory, a storage unit temporarily stores the encoded data slice in its local memory. The storage unit then converts the DSN logical address of the encoded data slice into a cloud-based alternative memory logical address for storage in the cloud-based alternative memory. For example, if the storage unit is using one or more storage units of a different DSN as the cloud-based alternative memory, the storage unit would convert the current DSN logical address (e.g., the slice name in accordance with the current DSN) of the encoded data slice to a DSN logical address that pertains to the one or more storage units of the different DSN (e.g., a slice name in accordance with the different DSN). The storage unit then outputs the encoded data slice for storage in the cloud-based alternative memory based on the cloud-based alternative memory logical address.

The method continues with step 86 where the rebuilding module determines whether to rebuild the encoded data slice using a full rebuild operation or partial rebuild operation. The rebuilding module will determine to rebuild the encoded data slice using the partial rebuild operation when the rebuilding module detects that a storage unit is storing more than one encoded data slice from the set of encoded data slices needed for the partial rebuild operation. Due to its cloud-based alternative memory, a storage unit is capable of storing multiple slices from the same set of encoded data slices. Without the cloud-based alternative memory, these slices would typically be stored in different storage units. A storage unit that stores multiple slices from the same set of encoded data slices is able to combine partial rebuilding data based on these slices prior to outputting the data to the rebuilding module. A partial result based on more than one slice is the same size as partial rebuilding data generated from one slice. Therefore, this method creates an I/O reduction that is proportional to the number of slices held by the storage unit with one or more encoded data slices from the set of encoded data slices. Due to this I/O reduction, the rebuilding module will opt to perform a partial rebuilding operation rather than a full rebuild operation when more than one encoded data slice from a set of encoded slices is stored within the same storage unit. Note that the rebuilding module may be a separate computing device, may be a common computing device, and/or may be integrated into one or more of the computing devices 12-16, the managing unit 18, the integrity processing unit 20, and/or into one or more of the storage units 36.

When the rebuilding module determines that the encoded data slice will be rebuilt using a partial rebuild operation, the method continues with step 88 where the rebuilding module sends partial rebuild requests to the storage units storing multiple slices of the set of encoded slices. The rebuilding module may send a partial rebuild request to multiple other storage units depending on what data is required to rebuild the encoded data slice.

The method continues with step 90 where the storage unit generates partial rebuilding data in response to the partial rebuild request. For example, the storage unit will generate partial rebuilding data for the encoded data slice stored in local memory. The storage unit may then retrieve the slice stored in the cloud-based alternative memory in order to generate partial rebuilding data for that slice. Other storage units that receive a partial rebuild request will generate other partial rebuilding data based on other slices needed to perform the partial rebuild operation. A more detailed discussion of generating the partial rebuilding data is described previously with reference to FIGS. 10.

The method continues with step 92 where the storage unit storing multiple slices from the set of encoded data slices will generate a partial result by combining the partial rebuilding data generated from the one or more slices it stores. The storage unit performs a function on the partial rebuilding data to generate the partial result. For example, the rebuilding module performs an exclusive OR function in Galois Field (2) on the partial rebuilding data generated from the one or more slices to generate the partial result.

The method continues with step 94 where the rebuilding module creates a rebuilt encoded data slice by combining the partial result and the other partial rebuilding data from other storage units. For example, a storage unit storing more than one slice of a set of encoded data slice will send the partial result generated from combining the partial rebuilding data based on one or more stored slices to the rebuilding module. Any other storage units that generated other partial rebuilding data will also send this data to the rebuilding module. The rebuilding module will then perform a function on the partial data to create the rebuilt encoded data slice. For example, the rebuilding module performs an exclusive OR function in Galois Field (2) on the set of partial slice rebuilding data and/or combined partial results to generate the rebuilt encoded data slice.

When the rebuilding module determines that the encoded data slice will not be rebuilt using a partial rebuild operation, the method continues with step 96 where the rebuilding module performs a standard or full rebuild operation to rebuild the encoded data slice. To perform the full rebuild operation, the rebuilding module sends slice retrieval requests to the necessary storage units that are not storing the encoded date slice that requires rebuilding. Those storage units then send the subset of encoded slices of the set of encoded slices to the rebuilding module in response to the slice retrieval requests. The rebuilding module then reconstructs the data segment from the subset of encoded slices. The rebuilding module then dispersed error encodes the reconstructed data segment to produce a new set of encoded slices and selects one of the new set of encoded data slices as the rebuilt encoded data slice.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
   detecting, by a rebuilding module within a device of a dispersed storage network (DSN), an encoded data slice of a set of encoded data slices that requires rebuilding, wherein a data segment of a data object is dispersed storage error encoded into the set of encoded data slices, wherein a storage unit of the DSN includes a local memory and cloud-based alternative memory, wherein the storage unit stores at least one of first and second encoded data slices of the set of encoded data slices in the cloud-based alternative memory;
   determining, by the rebuilding module, whether to rebuild the encoded data slice using a full rebuild operation or partial rebuild operation; and
   when determined to rebuild the encoded data slice using the partial rebuild operation:
      sending, by the rebuilding module, a partial rebuild request to the storage unit;
      generating, by the storage unit, first partial rebuilding data based on the first encoded data slice and second partial rebuilding data based on the second encoded data slice;
      creating, by the storage unit, a partial result by combining the first partial rebuilding data and the second partial rebuilding data; and
      creating, by the rebuilding module, a rebuilt encoded data slice from the partial result and other partial rebuilding data from other storage units.

2. The method of claim 1 further comprises:
   converting, by the storage unit, a first DSN logical address of the first encoded data slice into a first physical address for storage in the local memory;
   converting, by the storage unit, a second DSN logical address of the second encoded data slice into a cloud-based alternative memory logical address for storage in the cloud-based alternative memory; and
   outputting, by the storage unit, the second encoded data slice for storage in the cloud-based alternative memory based on the cloud-based alternative memory logical address.

3. The method of claim 1, wherein the determining whether to rebuild the encoded data slice using the partial rebuild operation comprises:
   detecting, by the rebuilding module, that the storage unit is storing more than one encoded data slice from the set of encoded data slices.

4. The method of claim 1, wherein the generating the first partial rebuilding data comprises:
   retrieving, by the storage unit, the first encoded data slice;
   generating, by the storage unit, a first partial decode matrix by performing a partial decoding of the first encoded data slice using selected rows of a decoding matrix; and
   generating, by the storage unit, the first partial rebuilding data by matrix multiplying the first partial decode matrix with a reduced encoded matrix.

5. The method of claim 1, wherein the generating the second partial rebuilding data comprises:
   retrieving, by the storage unit, the second encoded data slice;
   generating, by the storage unit, a second partial decode matrix by performing a partial decoding of the second encoded data slice using selected rows of a decoding matrix; and
   generating, by the storage unit, the second partial rebuilding data by matrix multiplying the second partial decode matrix with a reduced encoded matrix.

6. The method of claim 1 further comprises:
   detecting, by the rebuilding module, a second storage unit of the DSN having a second local memory and a second cloud-based alternative memory, wherein the second storage unit stores at least one of third and fourth encoded data slices of the set of encoded data slices in the second cloud-based alternative memory; and
   when determined to rebuild the encoded data slice using the partial rebuild operation:
      generating, by the second storage unit, third partial rebuilding data based on the third encoded data slice and fourth partial rebuilding data based on the fourth encoded data slice;
      creating, by the second storage unit, a second partial result by combining the third partial rebuilding data and the fourth partial rebuilding data; and
      creating, by the rebuilding module, the rebuilt encoded data slice from the partial result and the second partial result.

7. The method of claim 1 further comprises:
   when determined to rebuild the encoded data slice using the full rebuild operation:
      sending, by the rebuilding module, slice retrieval requests to a subset of storage units of a set of storage units of the DSN, wherein the subset of storage units does not include a particular storage unit that is assigned to storage the encoded data slice that requires rebuilding;
      receiving, by the rebuilding module, a decode threshold number of encoded slices of the set of encoded slices from the subset of storage units;
      reconstructing, by the rebuilding module, the data segment from the decode threshold number of encoded data slices;

dispersed storage error encoding, by the rebuilding module, the reconstructed data segment to produce a new set of encoded slices; and selecting, by the rebuilding module, one of the new set of encoded data slices as the rebuilt encoded data slice.

8. A computer readable memory comprises:

a first memory that stores operational instructions that, when executed by a rebuilding module within a device of a dispersed storage network (DSN), causes the rebuilding module to:

detect an encoded data slice of a set of encoded data slices that requires rebuilding, wherein a data segment of a data object is dispersed storage error encoded into the set of encoded data slices, wherein a storage unit of the DSN includes a local memory and cloud-based alternative memory, wherein the storage unit stores at least one of first and second encoded data slices of the set of encoded data slices in the cloud-based alternative memory;

a second memory that stores operational instructions that, when executed by the device of the DSN, causes the device to:

determine whether to rebuild the encoded data slice using a full rebuild operation or partial rebuild operation; and when determined to rebuild the encoded data slice using the partial rebuild operation:

send, by the rebuilding module, a partial rebuild request to the storage unit; and generate, by the storage unit, first partial rebuilding data based on the first encoded data slice and second partial rebuilding data based on the second encoded data slice;

create, by the storage unit, a partial result by combining the first partial rebuilding data and the second partial rebuilding data; and create, by the rebuilding module, a rebuilt encoded data slice from the partial result and other partial rebuilding data from other storage units.

9. The computer readable memory of claim 8 further comprises:

a third memory that stores operational instructions that, when executed by the storage unit of the DSN, causes the storage unit to:

convert a first DSN logical address of the first encoded data slice into a first physical address for storage in the local memory;

convert a second DSN logical address of the second encoded data slice into a cloud-based alternative memory logical address for storage in the cloud-based alternative memory; and output the second encoded data slice for storage in the cloud-based alternative memory based on the cloud-based alternative memory logical address.

10. The computer readable memory of claim 8, wherein the second memory further stores operational instructions that, when executed by the device, causes the device to determine whether to rebuild the encoded data slice using the partial rebuild operation by:

detecting, by the rebuilding module, that the storage unit is storing more than one encoded data slice from the set of encoded data slices.

11. The computer readable memory of claim 8 further comprises:

a fourth memory that stores operational instructions that, when executed by the storage unit of the DSN, causes the storage unit to generate the first partial rebuilding data by:

retrieving the first encoded data slice;

generating a first partial decode matrix by performing a partial decoding of the first encoded data slice using selected rows of a decoding matrix; and generating the first partial rebuilding data by multiplying the first partial decode matrix with a reduced encoded matrix.

12. The computer readable memory of claim 8 further comprises:

a fifth memory that stores operational instructions that, when executed by the storage unit of the DSN, causes the storage unit to generate the second partial rebuilding data by:

retrieving the second encoded data slice;

generating a second partial decode matrix by performing a partial decoding of the second encoded data slice using selected rows of a decoding matrix; and generating the second partial rebuilding data by multiplying the second partial decode matrix with a reduced encoded matrix.

13. The computer readable memory of claim 8 further comprises:

a sixth memory that stores operational instructions that, when executed by the rebuilding module within the device causes the rebuilding module to:

detect a second storage unit of the DSN having a second local memory a second cloud-based alternative memory, wherein the second storage unit stores at least one of third and fourth encoded data slices of the set of encoded data slices in the second cloud-based alternative memory; and a seventh memory that stores operational instructions that, when executed by the device, causes the device to:

when determined to rebuild the encoded data slice using the partial rebuild operation:

generate, by the second storage unit, third partial rebuilding data based on the third encoded data slice and fourth partial rebuilding data based on the fourth encoded data slice;

create, by the second storage unit, a second partial result by combining the third partial rebuilding data and the fourth partial rebuilding data; and create, by the rebuilding module, the rebuilt encoded data slice from the partial result and the second partial result.

14. The computer readable memory of claim 8, wherein the second memory further stores operational instructions that, when executed by the device, causes the device to:

when determined to rebuild the encoded data slice using the full rebuild operation:

send, by the rebuilding module, slice retrieval requests to a subset of storage units of a set of storage units of the DSN, wherein the subset of storage units does not include a particular storage unit that is assigned to storage the encoded data slice that requires rebuilding;

receive, by the rebuilding module, a decode threshold number of encoded slices of the set of encoded slices from the subset of storage units;

reconstruct, by the rebuilding module, the data segment from the decode threshold number of encoded data slices;

dispersed storage error encode, by the rebuilding module, the reconstructed data segment to produce a new set of encoded slices; and
select, by the rebuilding module, one of the new set of encoded data slices as the rebuilt encoded data slice.

* * * * *